United States Patent Office

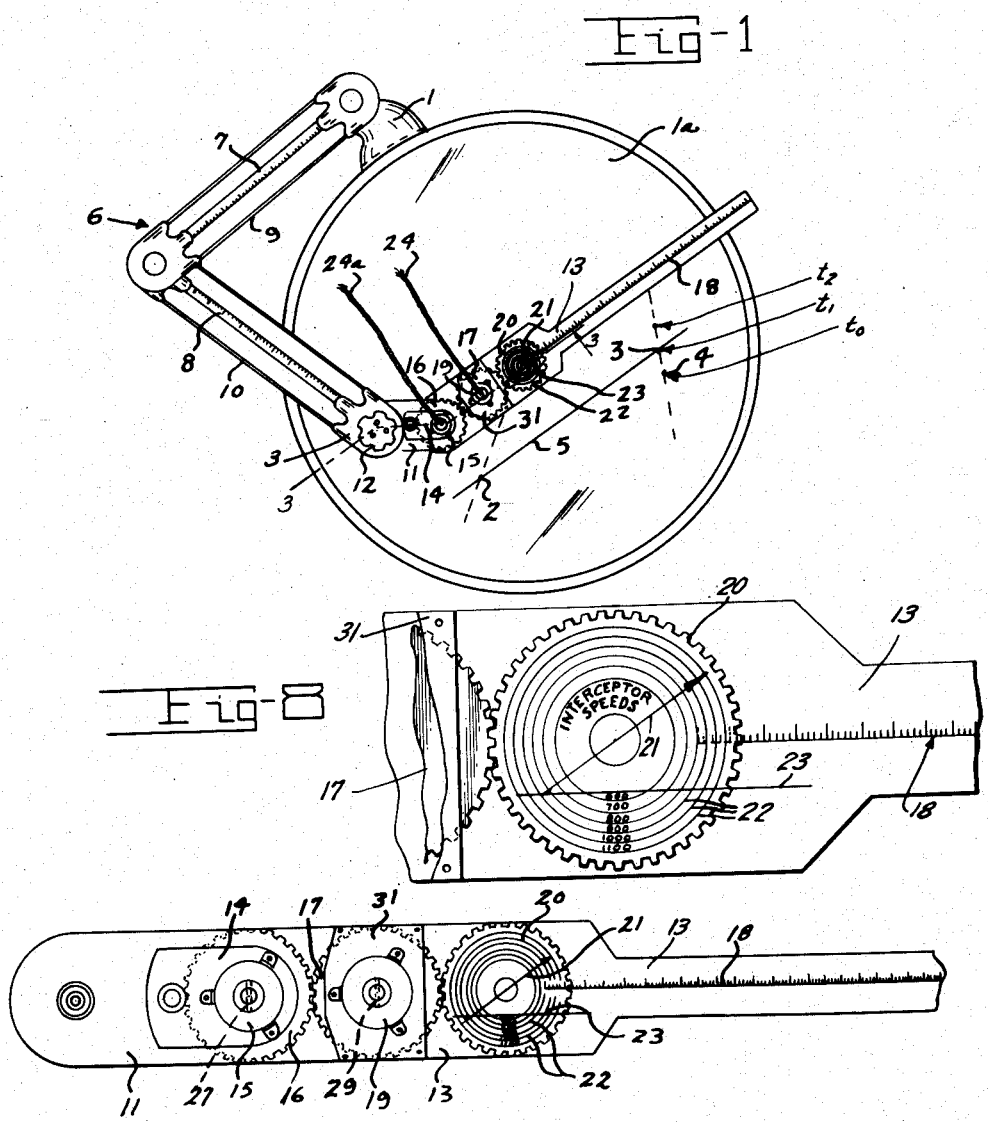

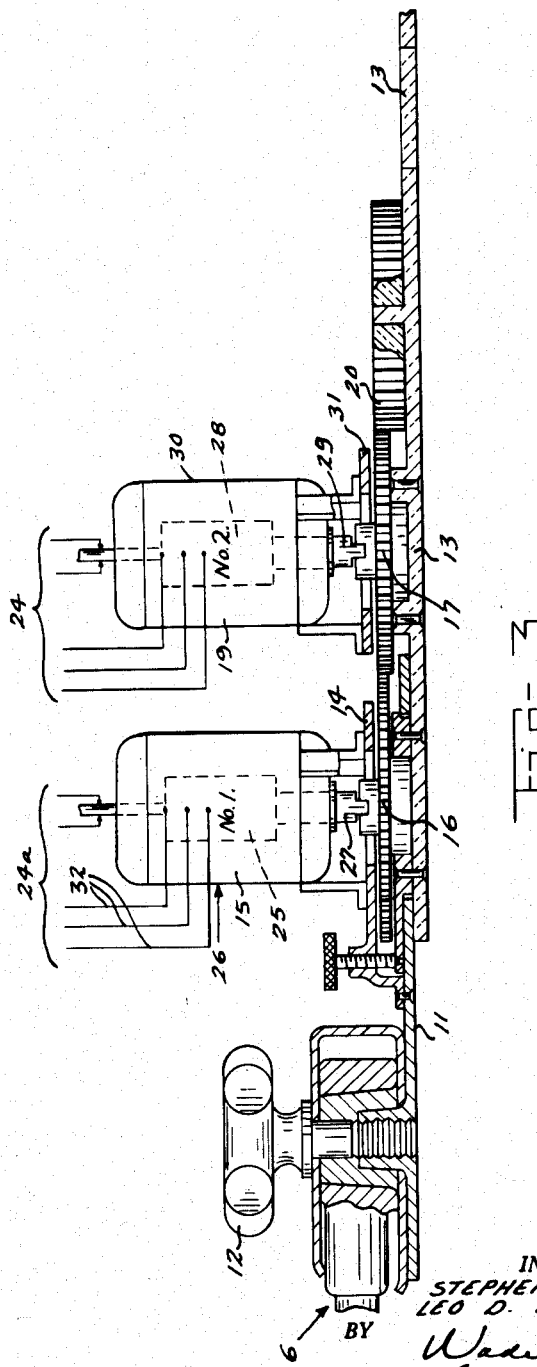

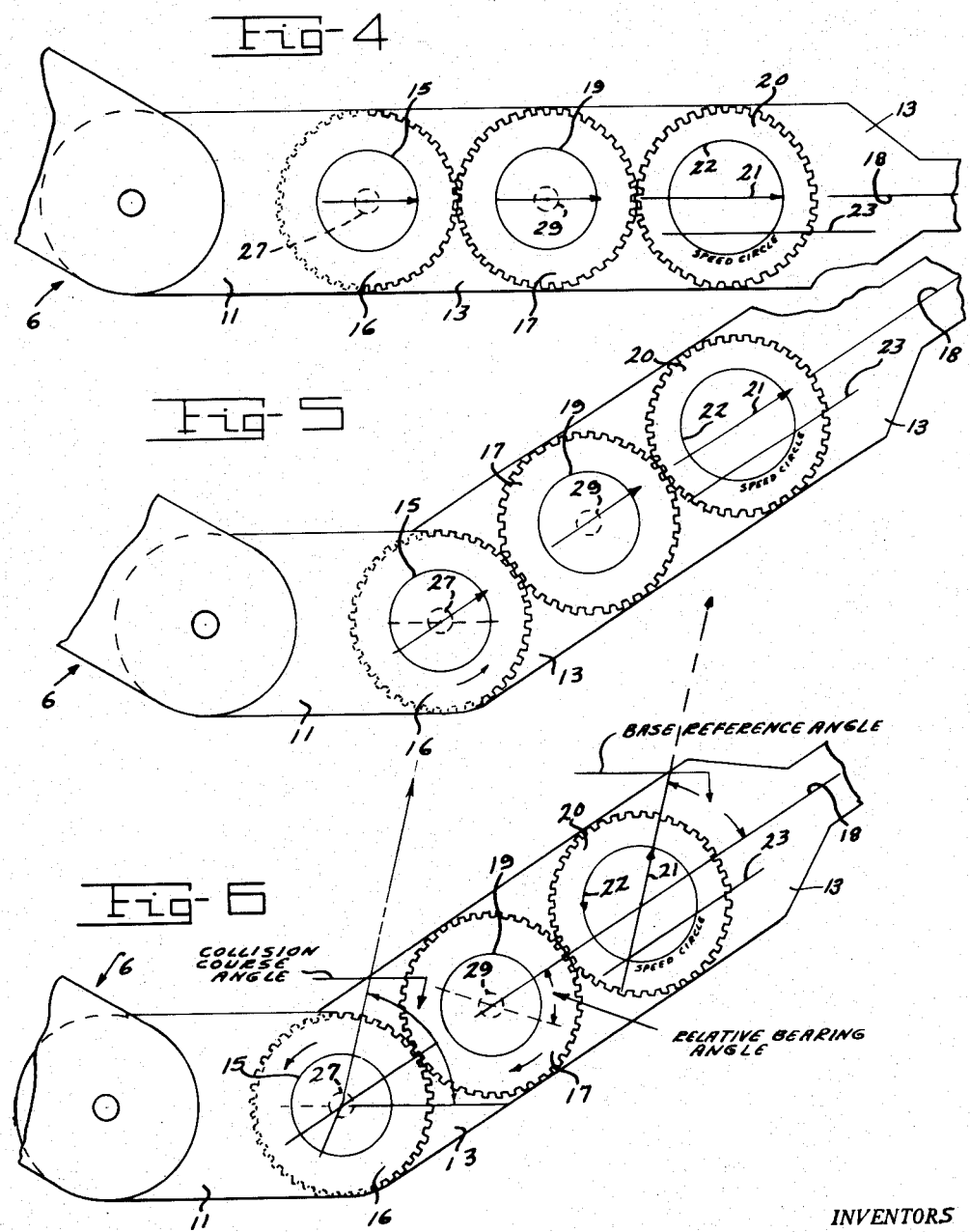

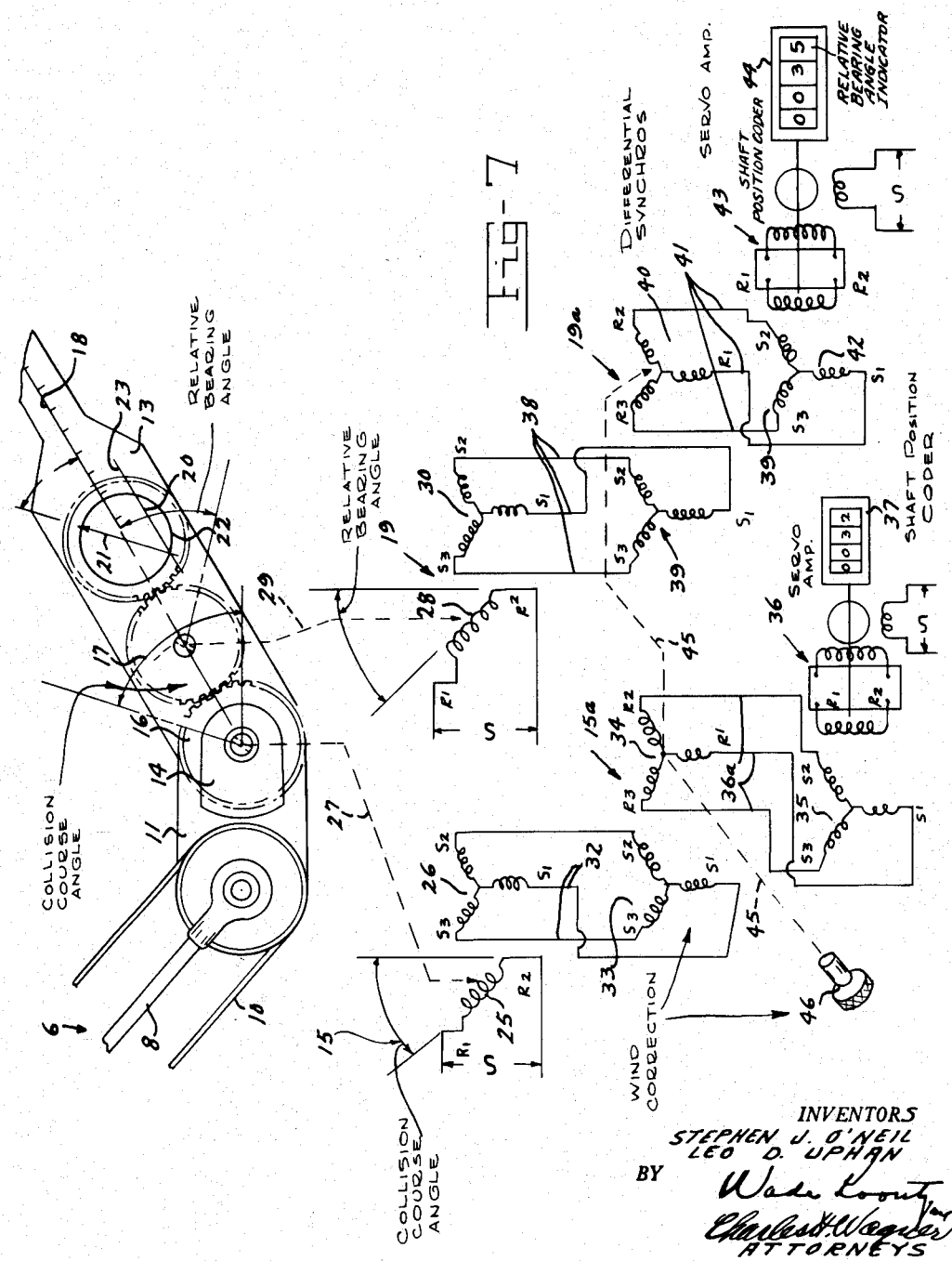

3,002,680
Patented Oct. 3, 1961

3,002,680
GRAPHICAL VECTORING COMPUTER
Stephen J. O'Neil, Lexington, and Leo D. Upham, Concord, Mass., assignors to the United States of America as represented by the Secretary of the Air Force
Filed Apr. 27, 1956, Ser. No. 581,255
13 Claims. (Cl. 235—61)
(Granted under Title 35, U.S. Code (1952), sec. 266)

The invention described herein may be manufactured and used by or for the United States Government for governmental purposes without the payment to us of any royalty thereon.

This invention relates to computer devices and more particularly to geographical vectoring computers and methods for computing collision courses, bearing angles and range from a ground or some fixed geographical location, between a target aircraft or missile in flight and an interceptor aircraft in flight, as a means for obtaining collision course and bearing angle data or signals for directing the interceptor aircraft on an intersecting or collision course with the target aircraft.

A further object is the provision of a simple, convenient and easily adjusted collision course computing device which is especially adapted for use as an attachment with a P.P.I. Radar Scope located on the ground or at a fixed geographical location, whereby from successive positions of the target aircraft image on the screen of the scope at similar predetermined time intervals and at least one indicated position of the interceptor aircraft image on the scope at one of the predetermined time intervals, the proper collision course for the interceptor aircraft or missile toward the target aircraft or missile can be quickly and accurately determined.

A further object of the invention is the inclusion of means for automatically recording the relative bearing angle and true collision course for the interceptor, from a fixed or ground location with respect to a future predicted or assumed position of the target aircraft.

A still further object is the provision of a collision course calculator located at a relatively stationary or fixed position, and a method and means for easily and geographically determining from that position the desired collision course for an interceptor aircraft with reference to the successive positions of a target aircraft in flight as determined by the target aircraft and the interceptor aircraft images on a P.P.I. Radar Scope display, in which means are provided for determining the collision course for the interceptor relative to the predicted speed of the interceptor aircraft and changes in position of the target aircraft on the scope in relation to an oriented reference means on the calculator.

A further object is the provision of a collision course determining apparatus for use with a P.P.I. Radar Scope at a fixed location, including adjustable mounting means for orienting the apparatus in relation to the orientation of the P.P.I. scope screen, or to a predetermined reference such as a map, for determining the collision course angle for the interceptor relative to the geographical reference, and including means for introducing windage corrections into the calculation.

A further object includes a collision course computer adapted for cooperative use with a target and interceptor position indicating means on the ground or at a fixed location, including collision course angle measuring means for determining the collision course for the interceptor aircraft relative to a subsequent predicted position in the line of flight of the target aircraft, and associated means for indicating the same on or from a ground position so that the same can be transmitted to an interceptor control means for determining the proper collision course for the interceptor aircraft.

The invention, in brief, comprises an adjustable support disposed for mounting in a fixed relation to a conventional P.P.I. Radar Scope or screen located at a fixed geographical ground location or position, together with parallel motion supporting means disposed for adjustment and orientation with respect to geographical location and orientation of the Radar Scope, on which a pointer or ruler is adjustably mounted in front of and parallel to the plane of the screen of the P.P.I. Radar Scope, the ruler or pointer being adjustably mounted for determining the direction between the initial spot images of an interceptor aircraft in flight and a target airplane in flight, at a predetermined initial time period or interval. The device includes a synchro transmitter and receiver means for determining or measuring this angle between an oriented reference line or base and the aforesaid line or initial direction between the interceptor aircraft and the target aircraft images, and also determines the collision course angle. The ruler is transparent and includes a center line through its pivotal center for registration with the initial line drawn on the scope between the target and interceptor spot images, and is also provided with an offset parallel reference line at one side of the center line at a predetermined space or distance therefrom, which is representative of a predetermined distance covered by the interceptor aircraft at a predetermined or known speed during a predetermined time interval, as displayed by the amount of movement of the interceptor aircraft indicating spot on the P.P.I. scope during this said predetermined time interval.

The ruler carries pivoted thereon a transparent interceptor speed indicator disk, pivoted on the aforesaid center line. This disk has a collision course direction indicating pointer or arrow passing through its pivotal center and a plurality of concentric interceptor aircraft speed indicating arcs or circles crossing the pointer and the offset line, the differences in radius of the concentric circles or arcs being representative of predetermined different distances which can be covered by the interceptor aircraft, as indicated by the movement of the interceptor spot image, during the aforesaid predetermined time interval.

The interceptor speed disk aforesaid is transparent and rotatably adjustable manually to dispose the intersection of arrow and any one of the selected speed indicating circles on the offset line, so that the direction of the arrow thereon is a relative function of the selected or determined speed of the interceptor aircraft.

When the ruler is thus adjusted so that its center line passes through the interceptor and target aircraft spot images at an initial time instant, for instance $t_0$, and the ruler is then moved to position speed disk center directly over the target aircraft spot at a time instant $t_1$, for instance, a line from the target image at $t_0$ to its subsequent position $t_1$ indicates, on the scope the predicted direction of flight of the target aircraft.

With the interceptor speed disk adjusted to dispose the intersection of the arrow and the selected speed circle representing the speed of the interceptor aircraft is disposed on the offset line, the arrow or pointer will be disposed to indicate on the scope a desired direction representing the shortest collision course relative to the center line and will indicate the relative bearing angle with respect to the center line, to the target's predicted future position.

The interceptor speed indicating disk is geared to a relative bearing angle determining synchro which sends out an electrical relative bearing angle indicating signal according to the degree of angular adjustment of the speed disk arrow, relative to the position of the center line of the ruler. The interceptor speed disk is also geared to a collision course angle determining synchro. The signal from the relative bearing angle determining synchro being zero when the arrow on the interceptor speed disk and ruler center line coincide, which would indicate a zero relative bearing angle. This relative bearing angle signal synchro is connected to an indicator for determining the relative bearing angle with respect to the ruler center line. Obviously when the target is in alignment with the interceptor's flight path (on the scope) at the time instants $t_0$ and $t_1$ it is only important (in the event that the target and the interceptor are going in the same direction) that the speed of the interceptor materially exceeds the speed of the target aircraft to effect a collision. If in the opposite directions, or toward each other, a collision is assured.

Provisions are made for introducing calculated similar windage corrections into the output signals from both the collision course angle indicator or recorder and the relative bearing angle or direction indicator or recorder.

Other objects and advantages of the invention will become apparent from the following description and accompanying drawings in which like reference characters refer to like parts in the several figures.

*Drawings*

FIG. 1 is a plan view, somewhat schematic, of the improved relative bearing angle and collision course angle computer showing the same operatively associated with a fixed conventional P.P.I. Radar Scope screen;

FIG. 2 is an enlarged fragmentary plan view of the device, part of a universal drafting machine or parallel motion transmitting support for the device being broken away;

FIG. 3 is a longitudinal vertical sectional view taken about on line 3—3 of FIG. 1, parts being broken away, or shown in section;

FIGS. 4, 5 and 6 are diagrammatic views, illustrating the principle involved in the solution of a collision course calculation;

FIG. 7 is a schematic wiring diagram of the computer, including the adjustable control means for simultaneously introducing windage correction signals into the relative bearing angle and collision course angle signal indications; and FIG. 8 is an enlarged fragmentary portion of the ruler showing the interceptor speed indicating disk on a larger scale.

Referring more particularly to FIG. 1, the reference numeral 1 denotes a fixed support at a fixed location adjacent a conventional P.P.I. Radar Scope 1ᵃ, which support 1 may be a bracket fixed to and projecting from the side of the P.P.I. Radar Scope 1ᵃ that is suitably connected to a conventional ground search radar (not shown).

The reference numeral 2 indicates a spot or "pip" image, on the screen of the scope 1ᵃ, of an interceptor aircraft or missile, such as observed at a time instant $t_1$ while 3 denotes a target aircraft or attacking missile spot image on the scope screen 1ᵃ, also at the same time instant $t_1$ and the spot image 4 represents a former position of the target image of the target aircraft or missile at a former time instant $t_0$.

The positions of the target and interceptor images as observed by the spots on the scope are noted at regularly spaced similar predetermined time instants such as times $t_0$, $t_1$ etc. by marking a grease pencil dot or dots on the scope face at the time instants $t_0$, $t_1$, etc., also a grease pencil base line is or may be drawn on the face of the scope between the target and interceptor images through their indicated positions on the scope at the time $t_1$ to constitute a base or reference line 5.

A conventional parallel ruler motion transmitting means 6, similar to a "Universal Drafting Machine" is fixed on the bracket 1 on the conventional P.P.I. Scope and comprises pivoted arms 7 and 8 and endless bands or tapes 9 and 10 fixed for controlling the parallel motion or maintaining the oriented position of an angularly adjustable supporting plate or arm 11, see also FIGS. 1 and 3, which supporting plate 11 may be oriented to any angle and then locked in its adjusted angular position relative to the screen of the scope 1ᵃ by clamping knob 12. This supporting plate 11 is thus angularly adjustable to orient the collision course and reference bearing angle computing device relative to the orientation of the P.P.I. Scope such as a fixed geographical reference or ground location and then clamped in its adjusted position by the clamp knob 12. Once this adjustment of the plate 11 has been made for a particular fixed geographical reference position relative to a base or map, or the orientation of the radar scope at a fixed ground position, this adjustment should not be changed.

Our improved collision course computing device further includes a ruler pivotally secured on the adjustable supporting plate 11, the ruler or elongated transparent plate indicated generally at 13. The supporting plate 11 has fixed thereto an upper plate 14 spaced therefrom on which is mounted a collision course signal synchro 15 with the "stator" 26 thereof fixed to the plate 14 over the pivot of the ruler 13. The rotor 25 is connected to a gear 16 so that angular adjustment of the ruler 13 on the supporting plate 11 (without rotation of the gear 16) sends out a proportional angle indicating signal representative of the angle adjustment of the ruler 13 on the plate 11.

The gear wheel 16 is journalled on the ruler 13, on the pivotal axis thereof and under the plate 14 and meshes with a gear 17 which is journalled on the ruler 13 on its center line 18, this gear 17 being connected in driving relation with the rotor 28 of a second or relative bearing angle signal determining synchro 19. Synchros 15 and 19 are hereinafter also referred to as synchros No. 1 and No. 2, respectively.

The casing or stator 30 of the synchro 19 is fixed to the ruler frame on a spaced parallel top plate 31 so that angular or rotative adjustment of the ruler 13 relative to the gear wheel 17 adjusts the rotor 28 of synchro 19 and its synchro signal output and this adjustment also adjusts the rotor 25 of the synchro 15.

A transparent interceptor speed and collision direction indicator disk 20 is journalled on the transparent wider portion of the ruler 13 on the center line 18 thereof and has a gear periphery in mesh with the gear 17. Rotative adjustment of this interceptor speed disk 20 also adjusts the rotors 28 and 25 of both synchros 19 and 15 (synchros No. 2 and No. 1).

This interceptor speed disk 20 has an arrow or pointer 21 extending diametrically across its center with a plurality of concentric interceptor speed indicating circles 22 around the pivotal center of the disk which intersect the arrow 21. The arcs or concentric circles 22 are progressively spacial radially outward from the center of the disk to progressively indicate predetermined increases in the predicted interceptor speeds, as represented on the screen of the P.P.I. Radar Scope during the aforesaid predetermined time period $t_0$ to $t_1$ etc. This is also determined in relation to the spacing between the center line 18 of the ruler and the offset line 23 since the space between the offset line 23 and the center line of the ruler indicate a distance therebetween which is proportional to the air distance which can be covered by the interceptor at a predetermined base or reference speed (as indicated by the movement, during such a time interval, of the interceptor image spot on the P.P.I. screen at that speed). This speed is also proportional to the other speeds of the interceptor during the same time interval $t_0$ to $t_1$, as indicated by the radial spacing of the concentric speed circles 22 on the speed disk 20 as seen in FIGS. 2 and 8. These arcs or speed circles 22 cross the offset interceptor air speed and time reference line 23 on the ruler (FIGS. 2 and 8), which line 23 is spaced from and parallel to the center line 18 of the transparent ruler 13, to indicate distances therebetween proportional to air distances which can be covered by the interceptor at predetermined different reference speeds indicated by the radii of the different concentric interceptor air speed indicating circles or arcs 22.

The stator and rotor circuit leads, from the synchros 15 and 19, are indicated at 24ᵃ and 24 respectively in FIGS. 1 and 3 and are more clearly shown in the electric circuit wiring diagram in FIG. 7.

It should be observed that the simple principle or method employed in obtaining the shortest collision course angle or interception direction for an interceptor to a target aircraft, from a display on the P.P.I. scope 1ᵃ is first noting and spotting the positions of the interceptor and the target aircrafts as they appear at predetermined spaced instants $t_0$, $t_1$, $t_2$, this being from a fixed ground position and when the interceptor and target aircraft are flying at about the same altitude; then, determining the direction of the base reference line 5 on the P.P.I. Radar Scope screen 1ᵃ, from the interceptor spot to the target image preferably by drawing a line with a grease pencil between the indicated position 2 of the interceptor aircraft and the indicated position 3 of the target aircraft at the instant of the beginning of the predetermined timing period ($t_1$). Next, at the end of this predetermined timing period ($t_1$) noting position of the target aircraft image and drawing a second line parallel to the first line which passes through the target aircraft image at the time instant $t_2$. A line through the indicated positions 4 and 3 at the beginning and ending ($t_1$—$t_2$) of the predetermined timing period denotes the predicted course, on the scope 1ᵃ, of the target aircraft and the angular relation between the base reference line 5 and the predicted direction of flight of the target aircraft is also determined.

The collision course is determined in this method by drawing an interceptor speed indicating circle with its center on the target indicated position 4 at the beginning (or end of the predetermined timing periods $t_0$ or $t_2$), the radius of the speed circle being proportional to the rate of speed (distance covered) by the interceptor as would be indicated on the scope 1ᵃ between the beginning and end of the predetermined timing period. This circle or arc will intersect the drawn line 5 referred to in two places. One of two lines drawn from the center of the interceptor speed circle or arc to the two points of intersection of the speed circle which this drawn line will indicate, on the scope, is the shortest and desired collision course between the interceptor and the target aircraft, assuming the latter proceeds at the same speed on its predicted or future assumed course. This collision or interceptor course for the interceptor can be easily recognized since the other radial line from the center of this interceptor speed prediction circle through its intersection with the drawn line 5 will indicate a divergent direction for the interceptor relative to the presumed course direction of the target aircraft, rather than the desired convergent interceptor course direction toward the advancing position of the target image on the scope 1ᵃ, from its initial target position at time $t_0$ to the target positions at the subsequent time instance $t_1$, $t_2$, etc., windage not as yet being taken into consideration, and will not indicate a collision course desired for the interceptor toward the subsequent predicted target position. In other words there can be two radial lines from the center of the speed circle which will cross the parallel line 5 from the point representing time $t_1$ and will cross the drawn circle representing the interceptor speed from time $t_0$ to $t_1$. One of these lines will converge or incline toward the extended line through the target aircraft's indicated positions at time $t_0$, $t_1$, $t_2$, etc. The other line will not; so, this latter direction line is discarded, while the other or retained line is used and is representative of the shortest collision courses (for the predicted speed of the interceptor, as determined by the radius of the interceptor speed circles). The relative indicated point of interception is where the projected line for the target aircraft, extending through the points 4 and 3, crosses the projected line from point 2 at time $t_1$, inclining toward the predicted interceptor course indicating direction line.

In the operation of the device, so far described, assuming that the target and interceptor aircraft images are indicated at noted time instants $t_0$ and $t_1$, and have been marked by spots or grease pencil dots 4 and 3 (FIG. 1) on the face 1ᵃ of the radar scope, and a line 5 has been drawn connecting the target and interceptor spot images 2 and 3 at the time instant $t_1$, the ruler 13 is now adjusted about its pivot on the plate 11 so as to be parallel to this connecting line 5. This angular adjustment of the ruler also angularly adjusts the rotor 25 of the synchro relative to its stator and the ruler and plate 13 can now be locked in this angular reference position and then shifted by parallel relation to any other position on the face 1ᵃ of the scope by the parallel motion transmitting device 6.

The ruler 13 is now shifted (parallel to its former direction and the line 5) to position the center of the multiple interceptor speed indication disk 20 directly over the center of the interceptor aircraft spot 2 on the screen of the scope at the indicated position of the interceptor aircraft image at the time instant $t_1$.

The interceptor aircraft speed indicating disk gear wheel 20 is now rotatably adjusted, preferably manually until the point where the selected one of the concentric interceptor aircraft speed indicating circles 22, indicating the relative interceptor speed, as indicated above, and the intersecting arrow or pointer 21 intersects the offset predetermined or interceptor speed indicating line 23.

This adjustment of the disk 20 disposes the radial pointer or arrow 21 in either of two radial directions or positions. One radial position inclines toward the line through the points 4 and 3 at time instants $t_0$, $t_1$, etc. which indicate the predicted flight path or direction of the advancing target plane or missile and this adjustment of the speed disk is to be selected. The other adjustment of the speed disk arrow 21 at its intersection with the selected speed circle 22 and the offset line 23 diverges the pointing direction of the arrow 21 away from the target aircraft's predicted flight line direction for the progressive advance of the target spot images 4, 3, etc. and this latter possible adjustment of the speed disk and arrow is ignored and not made.

The line through the successive advancing spot images of the target aircraft at time instants $t_0$, $t_1$, $t_2$, etc. can be noted to indicate the present and assumed or predicted direction of flight of the target aircraft and the direction which the arrow points toward this line or course (through points 4 and 3) indicates the desired bearing angle of the target aircraft with respect to the ruler center line 18 and to the initial positions of the target and interceptor aircrafts.

Adjustment of the interceptor speed indicating disk 20, aforesaid, adjusts the rotor 28 of the synchro 30 (No. 2) relative to its stator so as to generate a signal proportional to the angular relation between the center line 18 of the ruler 13 and the direction which the arrow 21 points. This generates a relative bearing angle signal proportional to the angle between the initial indicated positions of the target and interceptor aircrafts at the time instant $t_1$ and the future predicted position of the target aircraft at the desired closest interception or collision point, windage calculations being omitted.

The interceptor speed indicating disk gear wheel 20 is now rotatably adjusted, preferably manually, until the point where a selected one of the speed circles 22, indicating the relative interceptor speed as indicated above, and the intersecting arrow or pointer 21 intersects the offset predetermined or reference interceptor speed indicating line 23. This adjustment disposes the pointer or arrow 21 in either of two positions, one inclines toward the line through the points 4 and 3 at time instants $t_0$, $t_1$, etc. which indicate the flight path of the advancing target plane or missile and is the adjustment to be selected.

The other adjustment points of the speed disk arrow at its intersection with the circles and offset line 23 diverges the direction of the arrow away from the target's predicted flight line direction for the progressive advance of the target spot images and is therefore ignored, a line through the successive or advancing target of the interceptor aircraft at times $t_0$, $t_1$, etc. on the scope can be noted, if desired, to indicate the present or assumed or predicted direction of flight of the target aircraft and the direction of the arrow or pointer 21 toward this target flight line or course indication indicates the desired relative bearing angle of the target aircraft with respect to the ruler center line and to the initial position of the target and interceptor aircraft.

Adjustment of the interceptor speed disk 20, as aforesaid, adjusts the rotor 28 of the No. 2 synchro so as to send out a signal proportional to the angular relation between the center line of the ruler and the direction of the arrow, and this generates a relative bearing angle signal proportional to the angle between the indicated position of the target and the interceptor aircraft, and the predicted future position of the target aircraft at the interception point, windage calculation being omitted.

Reference being made to the schematic diagram as shown in FIG. 7, the selsyn or synchro generator 15, as before mentioned, has the stator coils and casing fixed to and supported by the supporting plate 14 above the center of the gear wheel 16 while the rotor 25 of this selsyn 15 is connected or keyed to the gear wheel 16. The stator and casing of the synchro 19 are fixed to the supporting plate 31 on the ruler 13 while its rotor 28 is connected or keyed to the gear 17 so that the swinging of the ruler 13 to the desired angular position for instance parallel to the initial reference line or direction 5 between the interceptor and the target images at time instant $t_1$ adjusts the rotor 25 of synchro 15 relative to its case and stator and to the supporting plate 14, while adjustment of the speed disk 20, as before indicated, adjusts the rotors 25 and 28 of both selsyns 15 and 19. In other words, a readjustment occurs between the rotor and stator coils of the selsyn 15, and in the same direction, to provide a collision course angle signal for the interceptor relative to supporting plate 11 which determines a collision course angle relative to the geographic position of the scope $1^a$.

The final adjustment of the selsyn 15 produces an angular indication which provides a signal representative of the collision course angle to the line of the advancing target spot, indicating the desired shortest collision course for the interceptor while the selsyn 19, when adjusted by the speed disk 20 as indicated above indicates and transmits an output signal representative of the relative targe bearing direction angle between the line 5 between the interceptor and the target (at time $t_0$, or $t_1$) and the predicted course of the target aircraft, the calculated speed of the interceptor being as determined by the selected speed circle 22 at the intersection of the arrow 21 with the selected circle 22 at the parallel offset indicating line 23. The rotor of selsyn or synchro generator 15, indicated at 25, is coupled by mechanical interconnection 27 to the gear members 16 and 17, while the stator 26 is fixed to the plate 11 by the supporting cover plate 14, as shown in detail in FIG. 2 and FIG. 3.

The rotor 28 of the selsyn or synchro generator 19 includes a mechanical interconnection 29 to the intermediate gear member 17 while the stator 30 is fixed to the ruler 13 by the supporting cover plate 31.

The stator electrical conductor leads 32, from the synchro 15 (FIG. 7), are connected to the stator 33 of a differential selsyn or synchro generator $15^a$ having a rotor 34 connected to a selsyn or synchro transformer 35 by the leads $36^a$, the output signal of which controls, through a servo-amplifier 36, a collision course angle indicating device 37.

Still referring to the wiring diagram in FIG. 7, the stator leads 38 from the synchro or selsyn generator 19 connect the stator 39 of a differential selsyn or synchro generator $19^a$ having a rotor 40 connected by leads 41 to a selsyn or synchro transmitter 42, the signal output of which controls, through a servo amplifier 43, a target relative bearing angle indicator device 44. The rotors 34 and 40 of the selsyns or synchros $15^a$ and $19^a$ are simultaneously adjustable and are connected to a mechanical adjustment shaft or linkage 45 which is adjustable by a setting knob 46 for the purpose of introducing predetermined windage signal computations into the signal input for the indicators 37 and 44. Since the windage is assumed to affect the course of the interceptor and the target aircraft in a similar manner, the windage correction signal is introduced simultaneously in the servo transmitters 43 and 36 for the relative bearing angle indicator 44 and the collision course angle indicator 37. The relative bearing angle and collision course angles are both thus corrected for windage accordingly.

Briefly describing the operation, in connection with a P.P.I. scope, at a fixed or ground location as shown in FIG. 1 and assuming that the images or positions 2—4, 3 of an interceptor and a target aircraft or enemy missile are disclosed on the scope as advancing spots. Their positions are "spotted" graphically by grease pencil dots 2 and 3 at uniformly predetermined spaced time instants $t_0$, $t_1$, $t_2$. A line 4 is drawn on the direction noted extending between the interceptor and target images at some similar time instant such as time $t_1$ (or $t_0$). The ruler 13 is now placed on the screen of the scope $1^a$ and is adjusted on the supporting plate 11 so that its center line 18 extends through the target and interceptor spots at one of the similar time intervals. This adjusts the stator of the synchro 15 relative to the base line (center line 18) of the ruler. The parallel offset line 23 on the ruler 13 is spaced from the center line 18 a distance to represent a predetermined relative distance which will be covered by an interceptor aircraft flying at a predetermined speed during the aforesaid predetermined time interval $t_0$, to $t_1$.

The radial distance relations of the speed circles 22 to the pivotal center of the disk 20 are proportional to the distance between the center line 18 and offset line 23 for other and different (greater) interceptor speeds or on distances which an interceptor can cover during a similar time interval to that represented by the distance between the offset parallel line 23 and the center line 18. Therefore, the relative distance covered by the interceptor relative to a course as depicted on the scope $1^a$ perpendicular to said base reference center line 18 during the aforesaid predetermined time interval between time instants $t_0$ to $t_1$ will be the point where the arrow 21, as seen in FIG. 8, intersects the parallel offset reference line 23 at the point where one of the circles representing the relative air speed of the interceptor crosses the arrow, and the direction of the arrow 21 relative to the center line is the base reference angle. This therefore adjusts servo 19 to generate a signal proportional to this base reference angle between the base line 18 and 5, and the direction along the line through points 4 and 3 of the target.

Noting the subsequent or previous positions of the target spots 3 on the scope screen $1^a$ at the aforesaid uniform time instants, the assumed direction or course of the missile or target is or can be predicted from the ground. This adjustment of the speed disk 20 points the arrow point toward the assumed collision course of the interceptor on the screen toward the path of the target, and through the gearing between the speed disk 20 and the intermediate gear 17, which drives the rotor 28 of the selsyn 19, therefore, generates a relative bearing angle signal proportional to the adjustment of the arrow 21 on the speed disk 20. This signal is representative of the relative bearing angle from the base reference or center line 18 to the predicted collision point of the target.

It should be recalled that the rotor 25 of the selsyn 15 is connected to the gear 16 which meshes with the intermediate gear 17 that is adjusted by the speed disk 20 and, therefore, the adjustment of the speed disk 20 as aforesaid readjusts the rotor 25 of selsyn 15 relative to its stator 26 while the angular adjustment of the ruler initially adjusts the rotor 25, also relative to the stator 26. Therefore, when the ruler and speed disk are both adjusted, there is a compound adjustment of selsyn 15. This provides a "shortest collision course" angle signal for the subsequent advancing directions of the interceptor and the target airplane, which can be used to direct the interceptor toward the predicted future position of the target in space.

Selsyn 19 will therefore indicate the relative bearing angle from the initial direction between the target and interceptor at some initial time instant such as time $t_1$ and the future predicted position of the target at point of collision with the interceptor. While the readjustment of the selsyn 15 by the speed disk 20 will indicate the proper collision course angle toward the predicted future position of the target at the point of interception thereof in relation to the initial adjusted reference position of the ruler 13 on the supporting plate 11.

The invention has been illustrated and described in connection with a preferred embodiment for illustrative rather than restrictive purposes since modification and changes in the details of the invention may be made without departing from the spirit and scope of the invention as defined in the accompanying claims.

We claim:

1. A method for indicating from the ground the shortest collision course for an interceptor aircraft in flight relative to a target aircraft in flight at a slower speed than the interceptor aircraft which comprises; graphically indicating the relative positions of the target aircraft and the interceptor aircraft on a plane surface at the ends of a plurality of uniform time intervals, drawing a straight line through the represented target and interceptor aircraft positions representing their relative positions substantially simultaneously at the beginning of one of said uniform time intervals to establish a base reference line, drawing a reference second line through the adjacent represented target aircraft position on said plane surface which is parallel to the first or base reference line equal to a relative distance covered by the target aircraft during the succeeding time interval, noting the advancing direction of the target aircraft by the progressing indicated positions of the target aircraft on the plane surface representing the successive positions of the target aircraft at the ends of successive uniform similar time intervals to determine the flight direction of said target aircraft relative to said base reference line, scribing an arc on said plane surface having a radius proportional to the interceptor flight distance covered during the time interval elapsed between the represented position of said target aircraft on said base reference line and its position on said adjacent parallel line, with the center of said arc located at the represented target position on said base reference line, locating the shortest interceptor collision course direction by a collision direction course line inclining toward the direction on said plane surface indicating the progressive changes in position of the advancing target aircraft at the ends of said succeeding time intervals, which collision direction course line passes through the center of said arc and the intersection of said arc with the said parallel line which is adjacent to the parallel line on which the center of said arc is located, whereby the last established line through the center of said arc and the intersection of the arc with said adjacent parallel line indicates the shortest collision course for the interceptor relative to the predicted course and predicted position of the target aircraft.

2. A method for indicating the shortest collision course graphically from the ground on a plane surface for an interceptor aircraft relative to a target aircraft having a slower speed than the interceptor where the interceptor and target aircraft are flying at approximately similar altitudes, which comprises locating and spotting the positions of the target aircraft and the interceptor aircraft at a known time instant on a radar P.P.I. scope at a fixed geographical location, drawing a line through said spotted positions of the target and interceptor aircraft to establish a base reference line, locating and spotting at least the next succeeding represented position of the target aircraft on the P.P.I. Radar Scope at the end of a succeeding uniform predetermined time interval to determine the direction and relative speed of the target aircraft in flight relative to said geographical location, then drawing a parallel offset line adjacent to the base reference line which passes through a subsequent spotted position of the target aircraft on the P.P.I. scope spaced from said first mentioned line which is proportional to the assumed speed and position of the target aircraft on the scope from the beginning to the termination of said succeeding time interval, locating an interceptor speed circle with its center on the target position on said first mentioned base reference line, and having a radius equal to the relative distance covered by the interceptor aircraft image on said P.P.I. scope representing distance covered by the interceptor aircraft image during said succeeding time interval, establishing a line through the center of said interceptor speed circle and through the selected point of intersection of said speed circle with said parallel offset line which inclines toward the progressing indicated advancing direction of the target aircraft image, which last line, relative to the said first mentioned base reference line indicates the direction of the shortest collision course direction for the interceptor relative to the direction of the advancing target aircraft.

3. A collision course calculator for a Radar P.P.I. Scope having a viewing face or radar screen located on the ground at a fixed geographical location; comprising a stationary support adapted to be disposed in fixed relation to said scope, an adjustable collision course calculator support, elongated parallel motion transmitting means connected at one end to said stationary support and at its other end to said calculator support for shifting said calculator support in predetermined parallel relation to said face or screen in its oriented position, elongated base reference means adjustably mounted on said calculator support for movement over said face or screen substantially parallel to said face or screen, means for holding said base reference means in angularly adjusted reference positions on said calculator support, collision course synchro signal transmitting means operatively connected to said adjustable collision course calculator support comprising stator and rotor means, said stator means being connected to said calculator support for adjustment therewith, relative bearing angle synchro signal transmitting means connected to said base reference means including stator and rotor means, said last mentioned stator means being connected to said base reference means, positive adjustment means between the rotor means of said synchros for simultaneous rotative adjustment thereof in the same sense, whereby angular adjustment of said base reference means adjusts the stator of said first mentioned synchro and adjustment of the second mentioned synchro adjusts the rotor of the first mentioned synchro in the same direction, said base reference means having a base reference line thereon extending longitudinally thereof, a transparent interceptor speed disk journalled on said base reference means with its center on said base reference line, an offset reference line extending longitudinally on said base reference means in parallel relation to said base reference line and spaced laterally therefrom a distance proportional to a predetermined distance traveled by said interceptor at a predetermined reference speed during a predetermined interval of time, said parallel line intersecting said speed disk intermediate its center and periphery, an interceptor speed indicator arc inscribed on said disk with its center at the center of said disk and having a radius proportional to the aforesaid predetermined distance traveled by said interceptor during one of said predetermined time intervals, a direction pointer on said speed disk extending across the pivoted center thereof to said arc, and positive actuating means between said speed disk and the rotor of said reference bearing angle indicator for simultaneous adjustment of the rotors of both of said synchros in the same sense incident to adjustment of said speed disk to dispose the point of intersection of said arc and pointer on said parallel reference line.

4. An interceptor collision course and target reference bearing angle indicator means comprising a stationary support located at a fixed geographical location, adapted for mounting in fixed relation adjacent the face of a Radar P.P.I. Scope on which the progressive positions of an interceptor and a target aircraft are displayed, a movable support, parallel motion transmitting means connected between the fixed support and said movable support for holding said movable support in its oriented position during movement thereof, elongated transparent base reference means adjustably mounted on said movable support for angular adjustment over the face of the P.P.I. scope substantially parallel thereto, means for holding said base reference means in said angularly adjusted positions on said movable support, a base reference line extending longitudinally on said base reference means for alignment with the pair of interceptor and target spot image positions at a time instant on said P.P.I. Scope, a second line on said base reference means extending parallel to said base reference line and spaced therefrom a predetermined distance proportional to a predetermined image travel distance on said scope of the interceptor at a predetermined speed at right angles to the parallel lines during a predetermined interval of time, a transparent interceptor speed determining disk journalled on said base reference means with its center on said base reference line and its periphery crossing said second line at two materially spaced points, an interceptor speed determining arc inscribed on said disk with its center coincident with the pivotal center of the disk and having a radius equal to a predetermined travel distance of the interceptor image on the P.P.I. scope when the interceptor is traveling at a predetermined speed during the predetermined time interval indicated by the space between the base reference and parallel lines, a pointer extending through the pivotal center of said speed disk to said arc intermediate its ends, bearing angle indicator means connected to said speed disk for adjustment thereby for indicating the relative bearing angle between the base reference line and said pointer, an interceptor collision course angle indicator connected between said speed disk and said movable support adjustable by relative rotative adjustment of said speed disk and angular adjustment of said base reference means whereby the pointer indicates the shortest collision course angle for an interceptor aircraft relative the position of said movable support base reference line.

5. Apparatus as claimed in claim 4 including reference bearing angle synchro signal transmitter means connected between said base reference means and said interceptor speed disk and connected to said reference angle indicator for adjusting the reference angle indicator in accordance with the rotative adjustment of said disk on said base reference means, and collision course synchro signal transmitter means connected between said movable support and said interceptor speed disk and connected to said interceptor collision course angle indicator for adjusting said interceptor collision course angle indicator in accordance with the angular adjustment of said base reference means on said adjustable support and the rotative adjustment of said interceptor speed disk for indicating the collision course angle between the direction of said arrow on said speed disk and a predetermined position of said adjustable support.

6. Apparatus as claimed in claim 5 including adjustable synchro signal transmitter means between both of the aforesaid synchro signal transmitter means for introducing a correction signal simultaneously into both of said synchro signal transmitter means outputs for simultaneous corrective adjustment in said reference bearing angle and said collision course indicators.

7. A reference bearing angle and collision course calculator for indicating a collision course between an interceptor aircraft and a target aircraft for use with a P.P.I. Radar Scope located at a fixed geographical location comprising a stationary support adapted to be disposed in fixed relation to said scope, an adjustable support, parallel motion transmitting supporting means between said supports for supporting the adjustable support in predetermined oriented position during movement thereof relative to said scope, transparent elongated base reference means pivotally mounted for angular adjustment on said adjustable support and movement over the face of said scope substantially parallel thereto, means for securing said base reference means in its adjusted positions on said adjustable support, said base reference means including an elongated transparent portion, a base reference center line extending longitudinally thereof, a transparent interceptor speed indicator disk rotatably mounted on said elongated transparent portion of said base reference means in outwardly spaced relation to the base reference means pivot, a plurality of concentric interceptor speed circles inscribed on said speed disk, each indicating a predetermined relative different distance of travel on said scope of the interceptor image during a predetermined interval of time, an arrow pointer on said speed disk passing through the pivotal center thereof and intersecting said speed circles, an interceptor speed reference line inscribed on said elongated base reference transparent portion in parallel relation to said center line and spaced therefrom a distance proportional to the predetermined relative image travel distance of an interceptor on the scope during the aforesaid predetermined interval of time, representing the distances covered by the interceptor flying at a predetermined speed as indicated by said speed circles, a relative bearing angle indicator synchro servo means connected between said speed disk and said base reference means for transmitting a signal indicating the angular adjustment of said speed disk on said base reference means relative to said center line, collision course indicator synchro servo means connected between said speed disk, said base reference means and said adjustable support connected for generating a signal proportional to the compound rotative adjustment of said speed disk on said base reference means relative to said center line and the angular adjustment of said base reference means on said adjustable support, a relative bearing angle indicator connected to and operated by said signal output from said relative bearing angle synchro signal means, and a collision course indicator connected to and operated by the signal output from said collision course indicator synchro servo means for indicating the collision course angle for the interceptor relative to the flight direction of the target aircraft proportional to the compound adjustment of said speed disk and said base reference means with reference to predetermined adjustments of said adjustable support.

8. Apparatus as claimed in claim 7 including windage signal transmitter means for introducing a windage correction signal in said relative bearing angle and said collision course indicators.

9. Apparatus as claimed in claim 7 including synchro servo windage transmitting means having a windage signal output connected to both of said synchro servo signal transmitting means and manual adjustment means therefor, for simultaneously introducing windage corrections in said synchro signal outputs.

10. A collision course computer comprising a geographically located fixed support, an adjustable support thereon, parallel motion transmitting supporting means connected between said supports for retaining said adjustable support in a predetermined oriented relation during movement thereof over a plane surface, an elongated transparent ruler member pivoted to said adjustable support for angular adjustments parallel to said plane surface, means for releasably retaining said ruler in said angular adjusted positions, a base reference line inscribed on said ruler extending longitudinally thereof, an offset line inscribed on said ruler parallel to said reference line and spaced from said reference line a predetermined distance proportional to the distance covered by an interceptor aircraft in flight during a predetermined interval of time, a transparent interceptor speed indicator disk pivotally mounted on said reference line of said ruler in radially spaced relation to the pivot between said ruler and said adjustable support, selsyn differential signal generator means connected between said speed disk and said adjustable support having a signal output proportional to the compound adjustment of said ruler and rotative adjustment of said speed disk, said speed disk having a radial pointer thereon and a plurality of concentric interceptor speed indicating circles thereon, the radius of each of the circles being proportional to a different predetermined distance travelled by an interceptor during the aforesaid interval of time period and interceptor travel represented by the space between said reference line and said offset parallel line, and collision course indicator means connected to said selsyn differential signal generator means for receiving a collision course signal therefrom for adjustment thereof proportional to the compound angular adjustment of said ruler and said rotative adjustment of said interceptor speed indicator disk.

11. Apparatus as set forth in claim 10 including independently adjustable selsyn signal generator means electrically connected between the first mentioned signal generator means and said collision course indicator means for introducing a windage correction signal in the signal output from said first mentioned signal generator means to said collision course indicator means.

12. A method for obtaining a collision course, from a ground position, between a target aircraft in flight and an interceptor aircraft in flight adapted to be directed toward said target aircraft, which comprises graphically locating, substantially simultaneous relative positions of said interceptor and target aircraft on a surface by indicating their relative locations thereon at a predetermined time instant, establishing on said surface a direction between the interceptor and target aircraft at said time instant as a base reference direction, graphically locating on said surface the relative advanced position of the target aircraft at the end of a subsequent continuing uniform time interval, establishing on said surface a direction line which is parallel to said first established base direction and passes through the advanced target position noted on said surface at said end of said predetermined time interval, drawing an arc on said surface with its center located on said interceptor position on said first base reference direction, in which said arc has a radius proportional to the relative velocity of the target aircraft to the interceptor aircraft between the time interval represented by the space between the base reference direction and the parallel direction line, locating a collision course direction between the interceptor and target aircraft's indicated positions on said surface by the direction between the center of the arc and one of the points where the arc crosses the parallel direction line, selecting the direction which inclines from the indicated position of the interceptor toward the assumed advancing direction of the target aircraft indicated on said surface by the first and subsequent indicated positions thereof on said surface at the beginning and end of the aforesaid predetermined time interval.

13. A method for indicating from a ground position, the shortest collision course between a target aircraft and an interceptor aircraft in flight at a predetermined speed adapted to be directed on said collision course toward said target aircraft which comprises, graphically locating the relative positions of the target aircraft and the interceptor aircraft at substantially the same time instant on a plane surface, drawing a first straight line on said surface which extends through said target and interceptor positions on said surface, indicating on said surface the subsequent relative position of the target aircraft with respect to its first indicated position thereon at the end of a predetermined time interval immediately following said time instant, drawing a second line indicating the predicted course of the target aircraft, extending through the aforesaid two indicated target aircraft positions on the surface, drawing a third line on said surface parallel to the aforesaid first line and extending through the indicated target position at the end of the predetermined time interval, describing an arc on said surface having a radius equal to the relative distance on the surface which can be traveled by the interceptor aircraft during a predetermined time interval equal to the aforesaid time interval of travel of the target aircraft, with the center of said arc located on the indicated position of the interceptor aircraft at the aforesaid time instant, whereby the arc intercepts said third parallel line, and extending a line through the center of the arc and the intersection between the arc and the third parallel line, inclining toward said second line represented on said surface to indicate the shortest collision course between the interceptor and the predicted course of the target aircraft.

References Cited in the file of this patent

UNITED STATES PATENTS

| | | |
|---|---|---|
| 970,431 | Davison | Sept. 13, 1910 |
| 1,297,788 | Buck | Mar. 18, 1919 |
| 1,661,686 | Bates | Mar. 6, 1928 |
| 1,782,294 | Florisson | Nov. 18, 1930 |
| 2,651,459 | Brady | Sept. 8, 1953 |
| 2,743,436 | Gale | Apr. 24, 1956 |
| 2,767,913 | Mitchell | Oct. 23, 1956 |

FOREIGN PATENTS

| | | |
|---|---|---|
| 552,381 | Germany | June 14, 1932 |
| 565,953 | Great Britain | Dec. 6, 1944 |

OTHER REFERENCES

"Navigational Crystal Ball . . ." from "Electrical Engineering," April 1952, vol. 71, No. 4, pp. 391 and 392.